Sept. 14, 1943.  E. W. EVANS  2,329,258
APPARATUS FOR MANUFACTURING TIRE CASINGS
Filed July 19, 1940
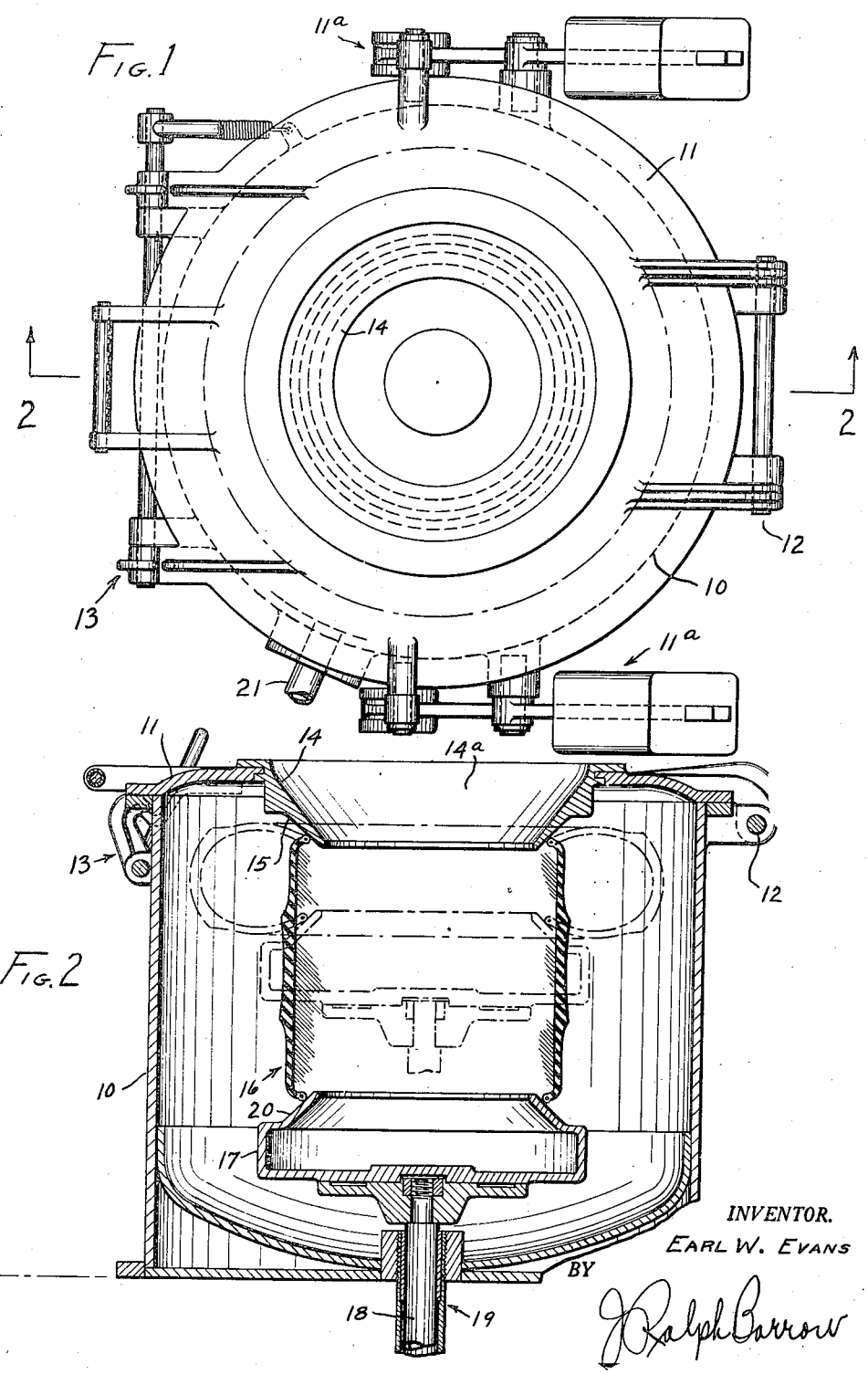
INVENTOR.
EARL W. EVANS
BY
J. Ralph Barrow

UNITED STATES PATENT OFFICE 2,329,258

APPARATUS FOR MANUFACTURING TIRE CASINGS

Earl W. Evans, Columbiana, Ohio, assignor to National Rubber Machinery Company, Akron, Ohio, a corporation of Ohio Application July 19, 1940, Serial No. 346,406

1 Claim. (Cl. 18—2)

This invention relates to apparatus for manufacturing tire casings, and particularly relates to apparatus for shaping tire casings.

An object of the invention is to provide apparatus of the character described which is self-adjusting to shape continuous tire-bands of various diameters.

Another object of the invention is to provide apparatus of the character described which is self-operating to center tire-bands placed thereon, and to correct any deformed or out of round condition of said bands.

These and other objects of the invention will be manifest from the following brief description and the accompanying drawing.

Of the accompanying drawing:

Figure 1 is a top plan view of apparatus embodying the invention.

Figure 2 is a cross-section taken substantially on line 2—2 thereof.

Referring to the drawing, the numeral 10 designates a chamber having a lid 11 hinged thereon at 12, to permit the lid to be swung toward and from fluid sealing relation with the open top of the chamber. Locking mechanism is provided at 13 for releasably locking the lid in sealed relation on the chamber. Suitable counter-weighted mechanism 11a may connect between chamber 10 and lid 11 to facilitate opening and closing of the lid.

Secured on lid 11 may be a tire band shaping and sealing member 14 having a central opening 14a communicating with the interior of the chamber, this member being formed with a conical portion 15 extending inwardly of the chamber to a substantial extent, thereby to provide a relatively large conical surface area for engaging upper bead portions of preformed tire-bands 16 of various sizes. Axially aligned below sealing member 14 may be a tire band shaping and sealing member 17 carried by a shaft 18, which is reciprocally received through fluid-sealed guide means 19 connected to the bottom of chamber 10. Member 17 is formed with an upwardly converging conical portion 20, in oppositely disposed relation to conical portion 15 of member 14, similarly to provide a relatively large conical surface area for engaging the lower bead portion of tire-bands 16 of various sizes received between members 14 and 17. Shaft 18 may be reciprocable at will, by any suitable means (not shown), to move member 17 toward and from the member 14, as shown in full and chain-dotted lines in Figure 2.

When lid 11 is closed to engage a tire-band 16 between members 14 and 17, a sealed space is thereby provided in the chamber 10, radially outwardly of casing 16. The interior of the casing thus communicates with the atmosphere through the top end of the casing and opening 14a in the member 14, the bottom end of the casing being closed by sealing member 17. Piping 21 may connect the interior of chamber 10 with a suitable source of suction (not shown) for evacuating said sealed space.

In the operation of the apparatus, the lid 11 is swung open on hinge 12 to permit approximate centering of a preformed tire-band 16 on the conical portion 20 of the shaping and sealing member 17, the latter then being in its lowermost position, shown in full lines in Figure 2. The lid 11 is next swung downwardly and locked in sealed relation with chamber 10, thereby to engage the conical portion 15 of sealing member 14 with the top bead portion of said tire-band. While suction is applied to the interior of chamber 10 through the piping 21, by operation of suitable valve means (not shown), the shaft 18 is caused to be urged upwardly to move sealing member 17 toward the chain-dotted position shown in Figure 2.

The suction applied to the outer periphery of the tire-band, combined with the movement of the tire beads toward each other, causes the tire-band to be expanded substantially to the shape shown in chain-dotted lines.

During the initial upward movement of member 17, the conical portions 15 and 20 of the respective sealing members cause the tire-band 16 to center itself on the sealing members, any deformity or out of round condition at the bead portions of the band being corrected by this movement. The conical portions 15 and 20 also make possible the shaping of a substantially wide range of tire sizes without changes or adjustments in the apparatus, the various sizes of bands automatically sealing on cones 15 and 20 at various elevations thereon. When the tire is shaped as described, the member 17 may be lowered before opening lid 11 to remove the shaped tire casing from chamber 10. The tire-bands 16 thus expanded to shape are in condition for placing in the usual vulcanizing mold (not shown).

Modifications of the invention may be resorted to without departing from the spirit thereof or the scope of the appended claim.

What is claimed is:

Tire shaping apparatus comprising a chamber, upper and lower tire shaping and sealing members relatively movable toward and from each other within said chamber, means for relatively moving said members, said members having oppositely disposed conical surfaces engageable with the opposite edges or bead portions of an endless tire-band received between said members to seal the space in said chamber outwardly of the tire-band, the conical surfaces of said upper and lower members each tapering or converging inwardly of said chamber to a substantial extent and with a substantial degree of taper to provide relatively large conical surface areas whereby tire bands of a range of various tire sizes as adapted for mounting on rims of various sizes may be seated edgewise at various substantially different elevations on the conical surface of the lower member and whereby the upper member may be engaged in the central openings of the tire bands with the upper edges of the bands against said upper conical surface at various elevations thereof, a tire of each tire and rim size finding its own elevation with respect to said conical surfaces, and means for evacuating said space in the chamber to expand a tire-band engaged between said members while the members are relatively moved toward each other.

EARL W. EVANS.